UNITED STATES PATENT OFFICE.

ERNST F. ALTHANS, OF BRESLAU, AND OTTO JUNGHANN AND HERMANN ÜLSMANN, OF STADT KOENIGSHÜTTE, PRUSSIA, GERMANY.

FIRE-PROOF COMPOUND FOR FURNACE-LININGS, CONVERTER-BOTTOMS, TUYERES, &c.

SPECIFICATION forming part of Letters Patent No. 234,737, dated November 23, 1880.

Application filed December 3, 1879.

*To all whom it may concern:*

Be it known that we, ERNST F. ALTHANS, of Breslau, Prussia, and OTTO JUNGHANN and HERMANN ÜLSMANN, of Stadt Koenigshütte, in Prussia, and Empire of Germany, have invented a new and useful Improvement in Fire-Proof Compounds for Furnace-Linings, Converter-Bottoms, Tuyeres, &c., which improvement is fully set forth in the following specification.

This invention relates to a fire-proof or refractory compound consisting of a mixture of dolomite or limestone, or both, and soda or potash, mixed together in substantially the proportion hereinafter set forth, and treated as described.

In carrying out our invention we take limestone, dolomite, or a mixture of these substances, and after crushing or grinding the same into a fine powder the same is sifted through a fine sieve, preferably of brass wire, containing about twenty meshes to the linear inch. The limestone or dolomite must both be as free as possible from acid reagents, as silicic acid, clay, and oxide of iron. With dolomite containing about ten per cent. of carbonate of magnesia, one part of dolomite, with five parts of lime yields a very suitable mixture containing one and seven-tenths per cent. of carbonate of magnesia. Larger proportions of carbonate of magnesia tend to diminish the fire-proof character of the compound. In the experiments made by us the limestone contained one per cent., the dolomite three per cent., of acid reagents.

A suitable binding material or cement for binding or cementing this base powder or material is obtained by dissolving about ten kilograms of carbonate of soda or potash in so much water that one hundred liters of solution are obtained. One hundred liters of this solution of binding material are then added to one thousand kilograms of base material. A moist plastic mixture is thus obtained of about such consistency that it can be balled by hand. This is then used for lining converters and other apparatus or for forming tiles and the like. In lining or covering the floor of converters the tuyeres are formed by inserting wooden plugs, which are then withdrawn. On exposure to a temperature of about 130° centigrade the lining or tiles and other materials consisting of this mixture are slowly dried and hardened, since the binding material hardens into a glass-like cement and binds or glues together the fine calcareous granules into a sort of sandstone. If too much moisture is used the tiles, while being dried, are apt to bulge out or curve. This defect can be cured by proper treatment with a knife; but by proper moistening it can be entirely obviated. The tiles shrink slightly on being dried, but preserve their regular form, so that the same, when used in constructing furnaces and in the construction of converter-lining, leave but slight interstices between them. The cement used for filling these interstices consists of the raw moist mixture, which is also serviceable in repairs, since it readily unites to a lining which has been already used or exposed to heat. Before using the apparatus are slowly warmed, and then heated to the required temperature. The fire-proof compound, exposed to a white heat, is fritted into a hard, lava-like, porous, and dark-gray mass or crust. On cooling the inner layer of the lining, which has been exposed to a white heat, contracts more readily than the outer layer, which has remained an unchanged, light-colored, and sandstone-like mass, and thus is liable to peel or flake off. In order to increase the tenacity of the mass in being converted from raw into fritted material, eight kilograms of fluoride of calcium are added to one thousand kilograms of the base material. The fluoride of calcium is softened by heat, and the mixture containing the same is less liable to peel or flake off. The tiles of this mixture can be burned in ordinary furnaces, such as are used for burning bricks, but the under layer of tiles has to rest on a flooring of burned lime, because on being heated they are liable to fuse together with any clayey or silicious material. In building furnaces care is to be taken that only those parts of the mixture come in contact with the basic or clayey materials which do not experience a high degree of heat.

The use of tiles from this compound cannot in general be recommended, because of the greater expense, of the difficulty of cementing the same, and especially since the fritted mass readily crumbles on exposure to air.

The mixture in which soda is used as a binding material has the advantage of being cheaper than when chloride of magnesium is used, as is described in a preceding application made by us.

Upon five different trials with a converter lined with this material, in which raw iron ore containing from one-tenth to one and four-tenths per cent. of phosphorus, and of different qualities, was exposed to a very irregular temperature and currents of air, it was discovered that the resulting product was an elastic and tough "flusseisen," in which, besides 0.014 to 0.024 per cent. of phosphorus, no other strange substance, as silicium or carbon, could be chemically discovered. From this it would seem that the lining of this fire-proof compound, and the slag resulting from the same and from the raw iron ore, and which contains about ten per cent. of silicic acid, possesses the chemical property of completely absorbing the ferric and ferrous oxides resulting from the burning of the raw iron ore. The time consumed for the process was about twenty minutes. The slag contains much less phosphoric acid than was to be expected from the contents of the raw material.

It may be remarked that in preparing the binding material or cement from soda or potash calcined soda or potash is preferable to caustic soda or potash, since the former does not burn or affect the skin and hands of the workmen as powerfully as the latter.

The fire-proof material of Thomas, according to his specifications of English Patents Nos. 289 and 908 of 1878, must contain, in order to be durable, not less than eighty per cent. of lime, earth, and magnesia, and more than seventy per cent. thereof after the burning of the tiles; also, about sixteen to twenty-six per cent. of substances containing silicium and aluminium, consequently acid substances in addition to the silicate of soda there mentioned, while our fire-proof material is purely basic. Furthermore, carbonate of soda forms our binding material, while such is mentioned by Thomas only in connection with his basic additions; and he uses as a binding material silicate of soda, which is not found in our material, or, if found at all, is only formed when the material is subjected to heating or burning.

On experiment we have found that our binding material acts on pure carbonate of lime in a peculiar chemical way. Hard Carrarien marble is, on exposure to red heat, dissolved in melted soda, ($NaCO_3$,) the same as in fluid chloride of calcium, ($CaCl$,) without more than a slight escape of carbonic acid; but on heating to a white heat the carbonic acid escapes, and the formerly-fluid mass is changed into a fixed fire-proof chemical combination in the former case of soda-lime earth; in the second place to calcium oxychloride. The plasticity of our unburned fire-proof material depends upon these peculiar properties, and on heating to a white heat its transformation into a stone-hard mass. As the soda is, furthermore, very cheap, it is certainly an improvement to employ only one per cent. of the same instead of five to ten per cent. of costly water-glass or silicate of soda, as is the case with Thomas.

We are aware of the United States Patents Nos. 218,334 and 218,335, granted Sidney S. Thomas, August 5, 1879; also, of the English Patents No. 4,422 of 1877 and Nos. 289, 903, and 2,835 of 1878.

What we claim as new, and desire to secure by Letters Patent, is—

A fire-proof or refractory compound consisting of dolomitic lime and alkalies, such as caustic soda or potash, or carbonate of soda or potash, mixed together about in the proportion and substantially in the manner set forth.

This specification signed by us this the 6th day of August, 1879.

ERNST F. ALTHANS.
OTTO JUNGHANN.
HERMANN ÜLSMANN.

Witnesses:
JULIUS JŒKEL,
KARL WINDERLICH.